United States Patent
Yavuz et al.

(10) Patent No.: US 10,961,343 B2
(45) Date of Patent: Mar. 30, 2021

(54) POROUS PORPHYRIN POLYMER AND METHOD OF RECOVERING PRECIOUS METAL ELEMENTS USING THE SAME

(71) Applicant: KOREA ADVANCED INSTITUTE OF SCIENCE AND TECHNOLOGY, Daejeon (KR)

(72) Inventors: Cafer Tayyar Yavuz, Daejeon (KR); Yeongran Hong, Daejeon (KR); Damien Thirion, Daejeon (KR); Saravanan Subramanian, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 9 days.

(21) Appl. No.: 16/212,052

(22) Filed: Dec. 6, 2018

(65) Prior Publication Data

US 2019/0194384 A1   Jun. 27, 2019

(30) Foreign Application Priority Data

Dec. 12, 2017 (KR) .................. 10-2017-0170184
Oct. 26, 2018 (KR) .................. 10-2018-0129227

(51) Int. Cl.
*C08G 61/12* (2006.01)
*B01J 20/22* (2006.01)
(Continued)

(52) U.S. Cl.
CPC .......... *C08G 61/124* (2013.01); *B01J 20/226* (2013.01); *B01J 20/28061* (2013.01); *B01J 20/28066* (2013.01); *B01J 20/28083* (2013.01); *B01J 20/305* (2013.01); *C08G 61/122* (2013.01); *B01J 2220/50* (2013.01); *C02F 1/285* (2013.01); *C02F 2103/08* (2013.01);
(Continued)

(58) Field of Classification Search
CPC .... C08G 61/124; C08G 61/122; B01J 20/226; B01J 20/28061; B01J 20/28066; B01J 20/28083; B01J 20/50; B01J 20/305; C02F 1/285; C02F 2103/08; C02F 2103/16; C02F 2261/3241; C02F 2261/3321
See application file for complete search history.

(56) References Cited

FOREIGN PATENT DOCUMENTS

| CN | 105924646 A | 9/2016 |
|---|---|---|
| CN | 107056794 A | 8/2017 |

(Continued)

OTHER PUBLICATIONS

Jiang et al., RSC Adv., 2015, 5, 98508.*
(Continued)

*Primary Examiner* — Shane Fang
(74) *Attorney, Agent, or Firm* — Hultquist, PLLC; Steven J. Hultquist

(57) ABSTRACT

A porous porphyrin polymer and a method of recovering precious metal elements using the same are described. A porous porphyrin polymer represented by Formula 1 has high selectivity for precious metal elements and a high ability to adsorb precious metal elements, and can be applied to the recovery of precious metal elements either from metal leachates of waste electronic products or from river water or seawater.

18 Claims, 12 Drawing Sheets
(12 of 12 Drawing Sheet(s) Filed in Color)

(51) Int. Cl.

| | | |
|---|---|---|
| *B01J 20/28* | (2006.01) | |
| *B01J 20/30* | (2006.01) | |
| *C02F 1/28* | (2006.01) | |
| *C02F 103/16* | (2006.01) | |
| *C02F 103/34* | (2006.01) | |
| *C02F 103/08* | (2006.01) | |

(52) U.S. Cl.
CPC .... *C02F 2103/16* (2013.01); *C02F 2103/346* (2013.01); *C08G 2261/3241* (2013.01); *C08G 2261/3321* (2013.01)

(56) References Cited

FOREIGN PATENT DOCUMENTS

| JP | H07122118 A | 10/1993 |
|---|---|---|
| JP | 2013129705 A | 7/2013 |
| JP | 2015167906 A | 9/2015 |
| KR | 1020070054636 A | 5/2007 |
| WO | WO2011090086 A1 | 5/2013 |
| WO | 2017111092 A1 | 6/2017 |

OTHER PUBLICATIONS

Chaudhary, A, et al., "Synthetic routes for phenazines: an overview", "Res Chem Intermed", 2018, pp. 1045-1083, vol. 44, Publisher: Springer.

Tao, L., et al., "Azo-bridged covalent porphyrinic polymers (Azo-CPPs): synthesis and CO2 capture properties", "RSC Advances", 2015, pp. 96871-96878, vol. 5, Publisher: The Royal Society of Chemistry.

Balde, C.P., et al., "The Global E-Waste Monitor—2014", "The Global E-Waste Monitor—2014: Quantities, Flows and Resources", 2015, pp. 1-80, Publisher: United Nations University.

Bettelheim, A., et al., "Electrochemical Polymerization of Amino-, Pyrrole-, and Hydroxy-Substituted Tetraphenylporphyrins", "Inorg. Chem.", 1987, pp. 1009-1017, vol. 26.

Cui, J., et al., "Metallurgical Recovery of Metals From Electronic Waste: A Review", "Journal of Hazardous Materials", 2008, pp. 228-256, vol. 158.

Falkner, K., et al., "Gold in Seawater", "Earth and Planetary Science Letters", 1990, pp. 208-221.

Jeffers, S., "Gold From Seawater", "http://amsciparis.blogspot.kr/2012/04/gold-from-seawater.html", Apr. 10, 2012, pp. 1-2.

Lodeiro, P., et al., "Gold Recovery From Artificial Seawater using Synthetic Materials and Seaweed Biomass to Induce Gold Nanoparticles Formation in Batch and Column Experiments", "Marine Chemistry", 2013, pp. 11-19, vol. 152.

Mchugh, J.B., "Concentration of Gold in Natural Waters", "Journal of Geochemical Exploration", 1988, pp. 85-94, vol. 30.

Terada, K., et al., "Preconcentration of Silver(I), Gold(III) and Palladium(II) in Sea Water with p-Dimethylaminobenzylidenerhodanine Supported on Silica Gel", "Analytica Chimica Acta", 1980, pp. 127-135.

Yuasa, M., et al., "Micellar Cobaltporphyrin Nanorods in Alcohols", "Journal of the American Chemical Society", 2004, pp. 11128-11129, vol. 126.

* cited by examiner

POROUS PORPHYRIN POLYMER AND METHOD OF RECOVERING PRECIOUS METAL ELEMENTS USING THE SAME

CROSS-REFERENCE TO RELATED APPLICATIONS

The priority of Korean Patent Application 10-2017-0170184 filed Dec. 12, 2017 and the priority of Korean Patent Application 10-2018-0129227 filed Oct. 26, 2018 are hereby claimed under the provisions of 35 U.S.C. § 119. The disclosures of Korean Patent Application 10-2017-0170184 and Korean Patent Application 10-2018-0129227 are hereby incorporated herein by reference, in their respective entireties, for all purposes.

TECHNICAL FIELD

The present invention relates to a porous porphyrin polymer and a method of recovering precious metal elements using the same, and more particularly to a porous porphyrin polymer having high selectivity for precious metal elements and a method of recovering precious metal elements using the same.

BACKGROUND ART

Precious metal elements generally include platinum-group elements, such as ruthenium, rhodium, palladium, iridium and platinum, and coinage metal elements, such as copper, silver and gold. These metals are essentially used in various industries, including the electronics industry, automobile industry, chemical processes, jewelry industry, and pharmaceutical industry, due to their excellent physical and chemical properties, such as high stability, electrical conductivity, ductility, malleability, gloss, and excellent catalytic properties.

These precious metal elements are used as important raw materials especially in high-tech industries, and as science and technology are highly developed, the demand therefor is increasing. However, the amount of valuable metals that can be extracted from natural mines is extremely small and is concentrated in some countries and regions. The results of examining the amount of gold produced in natural mines in 2016 indicated that top thirteen countries, including China, Australia, Russia, United States and the like, accounted for more than 70% of the world's gold production. The results of examining the amount of platinum-group metals produced from natural mines in the same year indicated that five countries, including Russia, South Africa, Canada, United States, and Zimbabwe, accounted for about 97% of the world's production of platinum-group metals, suggesting that the unequal distribution of resources is more severe (U.S. Geological Survey, Mineral commodity summaries 2017).

Therefore, the range of sources from which precious metal elements are obtained should be widened from primary sources, such as natural mines, to secondary sources, such as industrial waste, wastewater, rivers and sea.

As a representative example, efforts to recover precious metal elements from waste electronic products have been made in many countries of the world. This idea was derived from the concept of 'urban mining', which was first proposed by Professor Michio Nanjo (Tohoku University, Japan) in 1986, and means recovering and recycling important metals, which are accumulated around our life, in order to achieve innovation with limited resources. Waste electronic products contain various metals, such as copper, iron, aluminum, tin and the like, and among these metals, precious metals, such as gold, silver and palladium, account for less than 1% of the weight of the waste electronic products. However, due to the high price of precious metals, the value of most of waste electronic products is known to come from the recycling of precious metals (Hageluken, Christian. *Electronics and the Environment*, 2006. *Proceedings of the 2006 IEEE International Symposium on*. IEEE, 2006).

Thus, recovery of precious metals from waste electronic products can be considered an economically important technology that recovers highly valuable precious metals. In addition, metal recovery from waste electronic products is also important in environmental terms. With the development of the electronics industry, waste electronic products are generated in huge amounts worldwide is enormous, and the amount of waste electronic products generated is constantly increasing. It was reported that waste electronic products were generated in an amount reaching 41.8 MT in 2014 (Balde, C. P. et al., The global e-waste monitor—2014, United Nations University, IAS-SCYCLE, Bonn, Germany, 2015). These waste electronic products generate heavy metals, such as mercury, cadmium, lead and arsenic, and toxic gases during their treatment process, leading to an increase in water, air and soil pollution. Therefore, there is a need for the development of an environmentally friendly and efficient method of recovering metals from waste electronic products.

Methods that are currently used to recycle metals from waste electronic products include dry refining, wet refining and biological refining methods. In dry refining, pretreated waste electronic products are melted to slag in a furnace at a high temperature of 1,000° C. or higher. The slag and metal components are separated by the specific gravity difference, and precious metals are obtained as solid solutions in capturing metals. In wet refining technology, metals from pretreated waste electronic products are dissolved in a solvent. For metal leaching, inorganic acids, such as nitric acid and hydrochloric acid, are generally used, and cyanide, halide, thiourea, thiosulfate or the like is also used. Methods for recovering precious metal ions present in solution after leaching include ion exchange, solvent extraction, cementation, precipitation, and the like. Biological refining is a method of adsorbing and separating precious metal elements using alga, fungi or bacteria as adsorbents. Biological adsorption of precious metal ions contained in solutions can be largely divided into chemical adsorption and physical adsorption. Chemical adsorption mechanisms include complexation, chelation, microprecipitation, and microbial reduction, and physical adsorption mechanisms are generally explained by electrostatic force and ion exchange (Cui, Jirang et al., Journal of hazardous materials 158.2 (2008): 228-256).

In the case of dry refining, pretreatment of waste electronic products is relatively simple and convenient, but the equipment cost is very high, and a large amount of energy is consumed for high-temperature use. In addition, there are limitations in that the combustion of plastics cause air pollution and some metals such as aluminum are not recovered, and there is a disadvantage in that the recovery of precious metals is low due to the use of slag. In the case of wet refining, the equipment cost is lower than that of wet refining, and separation of metals is easy, but there are disadvantages in that valuable metals are recovered through several steps using various solvents or materials and toxic wastewater occurs in the recovery process. In current Korean valuable metal recovery companies, the kinds of metals to be recovered are limited to copper and the like, and the levels of technology for the preparation and design of processes for recovering valuable metals are low, and thus successful commercialization results are insufficient and the commercialization rate is lower than the research results. Biologically based technology has limitations in that it can be used only in very limited situations because of difficulties in controlling microbial behavior, in spite of its theoretical limitless possibilities.

Other examples of sources from which precious metal elements can be recovered include rivers or sea. It is known that seawater contains highly valuable metals, such as copper, silver, gold, palladium and platinum. Although the concentrations of these metal ions are very low (the order of a few ppt or less), the amount of metals in seawater is very large when considering the enormous amount of seawater in the world. For example, it is known that there are about 14.3 million tons of gold in seawater (http://amsciparis-.blogspot.kr/2012/04/gold-from-seawater.html).

Although the concentrations of such metal ions have been reported differently according to literature and measurement methods, it is generally known that the concentrations are very low (the order of a few ppt or less). However, when considering that more than 70% of the Earth's surface is covered with seawater, it can be seen that the amount of major metals contained in seawater is considerable (Lodeiro, Pablo et al., Marine Chemistry 152 (2013): 11-19., Terada, Kikuo et al., Analytica Chimica Acta 116.1 (1980): 127-135., McHugh, J. B. Journal of Geochemical Exploration 30.1-3 (1988): 85-94.).

The presence of gold in seawater was first reported in 1872, and an attempt to extract gold from seawater is a famous case which was made by Fritz Haber in 1920s. However, successful extraction of gold from valuable metals from seawater has not been reported yet, because the concentrations of metal ions in seawater are very low and it is difficult to control conditions, including the depth and temperature of seawater (Falkner, K. Kenison et al., Earth and Planetary Science Letters 98.2 (1990): 208-221).

Accordingly, the present inventors have made extensive efforts to solve the above-described problems, and as a result, have found that a porous porphyrin polymer represented by Formula 1 has high selectivity for precious metal elements, and thus can be applied for the recovery of precious metal elements either from metal leachates from waste electronic products or from river water or seawater, thereby completing the present invention.

SUMMARY OF THE INVENTION

The present invention has been made to solve the above-described problems, and it is an object of the present invention to provide a porous porphyrin polymer having high selectivity for precious metal elements.

Another object of the present invention is to provide a method in which a precious metal element in a precious metal-containing solution is selectively adsorbed using a porous porphyrin polymer, and the adsorbed precious metal element and a polymeric adsorbent are re-recovered.

The above objects of the present invention can be achieved by the present invention as specified below.

To achieve the above object, the present invention provides a porphyrin polymer represented by Formula 1 below:

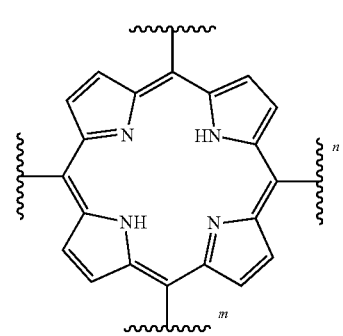

[Formula 1]

wherein n is an integer of 5,000 to 50,000, and m is an integer of 5,000 to 50,000.

The present invention also provides a method of preparing the porphyrin polymer, comprising a step of polymerizing a 5,10,15,20-tetrakis(4-nitrophenyl)-21H,23H-porphyrin monomer.

The present invention also provides an adsorbent comprising the porphyrin polymer.

The present invention also provides a method of recovering a precious metal element from a precious metal element-containing solution, the method comprising the steps of:

(a) adding an adsorbent comprising the porphyrin polymer of Formula 1 to the precious metal element-containing solution, and adsorbing the precious metal element onto the adsorbent; and (b) desorbing and recovering the precious metal element from the adsorbent adsorbed with the precious metal element.

The present invention also provides a method of recovering a precious metal element from a waste electronic product, the method comprising the steps of:

(a) removing a coating layer from a substrate of the waste electronic product;

(b) immersing the coating layer-removed substrate in an acidic solution, and filtering the solution;

(c) adding a basic solution and deionized water to the filtered solution, and then adding the adsorbent comprising the porphyrin polymer of Formula 1 thereto, and adsorbing the precious metal element onto the adsorbent; and (d) desorbing and recovering the precious metal element from the adsorbent adsorbed with the precious metal element.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

BEST MODE FOR CARRYING OUT THE INVENTION

Figure 1:
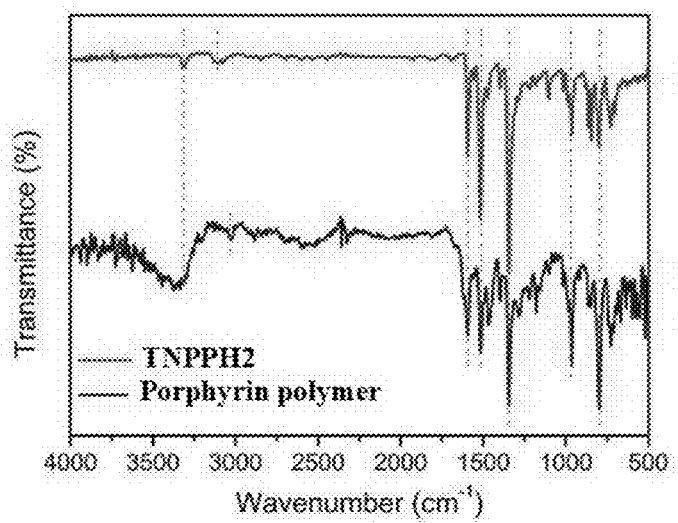
FIG. 1 is a graph showing the FT-IR spectra of the porphyrin monomer TNPPH2 and a synthesized porphyrin polymer.

Unless defined otherwise, all the technical and scientific terms used herein have the same meaning as those generally understood by one of ordinary skill in the art to which the invention pertains. Generally, the nomenclature used herein and the experiment methods, which will be described below, are those well-known and commonly employed in the art.

In the present invention, it has been found that a porous porphyrin polymer represented by Formula 1 has high selectivity for precious metal elements, and thus can be applied for the recovery of precious metal elements either from metal leachates from waste electronic products or from river water or seawater Therefore, in one aspect, the present invention is directed to a porphyrin polymer represented by Formula 1 below:

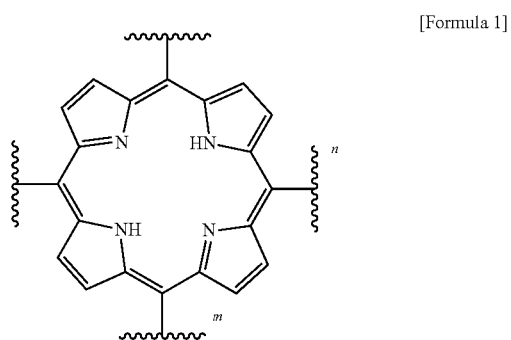 [SMILES: *c1c2nc(c(*)c3ccc([nH]3)c(*)c3nc(c(*)c4ccc1[nH]4)C=C3)C=C2]

[Formula 1]

wherein n is an integer of 5,000 to 50,000, and m is an integer of 5,000 to 50,000.

Formula 1 above may preferably be Formula 1-1 below:

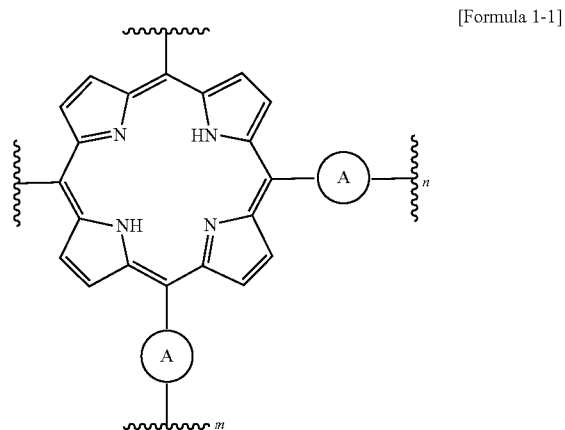

[Formula 1-1]

wherein n is an integer of 5,000 to 50,000, and m is an integer of 5,000 to 50,000, and Ⓐ may be any chemical linking group that connects porphyrins. Preferably, Ⓐ may be selected from the group consisting of phenazine, azo, amide, benzamide, and triazine, each of which can be represented by Formulas 3 to 7 below:

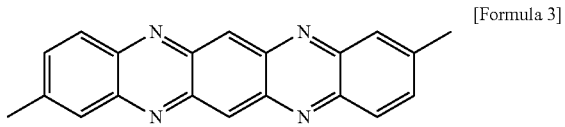

[Formula 3]

[Formula 4]

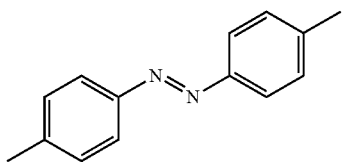

[Formula 5]

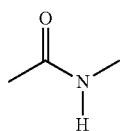

[Formula 6]

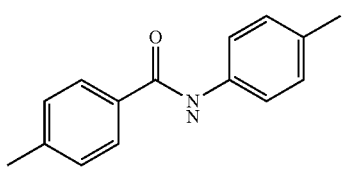

[Formula 7]

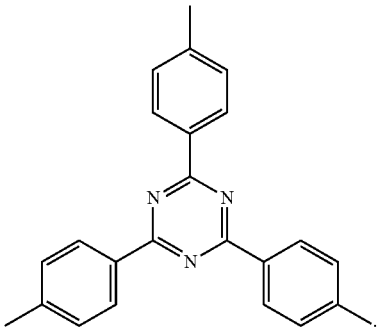

The porphyrin polymer according to the present invention may be represented by Formula 2 below:

[Formula 2]

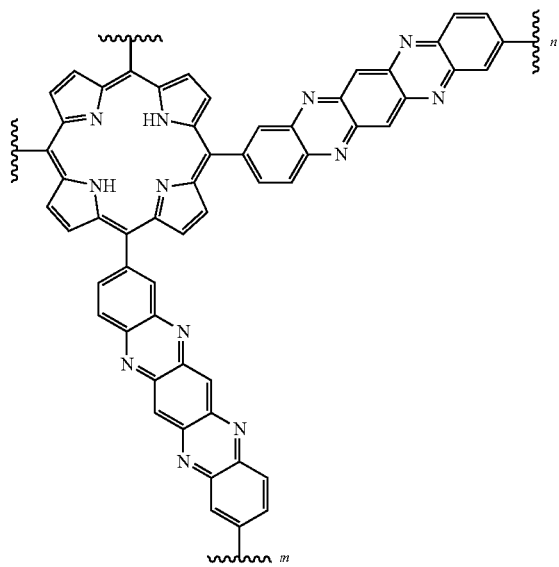

wherein n is an integer of 5,000 to 50,000, and m is an integer of 5,000 to 50,000.

The porphyrin polymer according to the present invention may have a specific surface area of 300-1000 $m^2g^{-1}$ and a pore size of 0-20 nm.

It has been confirmed that the porphyrin polymer according to the present invention is stable up to 330° C. under air and nitrogen atmospheres, suggesting that it has thermal durability.

In another aspect, the present invention is a method of preparing the porphyrin polymer, comprising a step of polymerizing a 5,10,15,20-tetrakis(4-nitrophenyl)-21H, 23H-porphyrin monomer.

The 5,10,15,20-tetrakis(4-nitrophenyl)-21H,23H-porphyrin monomer may be obtained by dissolving 4-nitrobenzaldehyde in propionic acid to obtain a solution, and then adding and reacting acetic anhydride and pyrrole with the solution.

The method of preparing the porphyrin polymer may comprise the steps of: mixing and reacting the 5,10,15,20-tetrakis(4-nitrophenyl)-21H,23H-porphyrin monomer, p-phenylenediamine and a base in water-free N,N-dimethylformamide to obtain a reaction product; and adding water to the reaction product to obtain a precipitate, and filtering and drying the precipitate, thereby obtaining the porphyrin polymer.

It has been found that the porphyrin polymer according to the present invention has high selectivity for gold or platinum metal ions in a mixture solution containing various metal ions, and has high adsorption efficiency at almost all pHs, and thus when the porphyrin polymer is applied to metal leachates from waste electronic products or to seawater, it can adsorb and recover gold or platinum metal ions with high selectivity compared to other metal ions.

In still another aspect, the present invention is directed to an adsorbent comprising the porphyrin polymer represented by Formula above.

In yet another aspect, the present invention is directed to a method of recovering a precious metal element from a precious metal element-containing solution, the method comprises: (a) adding an adsorbent comprising the porphyrin polymer of Formula 1 to the precious metal element-containing solution, and adsorbing the precious metal element onto the adsorbent; and (b) desorbing and recovering the precious metal element from the adsorbent adsorbed with the precious metal element.

Step (b) may comprise desorbing the precious metal element by adding the adsorbent adsorbed with the precious metal element to an acidic solution.

The precious metal element recovery method may further comprise, after step (b), a step of re-inputting the adsorbent desorbed with the precious metal element into step (a).

The adsorption ability of the precious metal element can be increased by performing step (a) while irradiating light.

The precious metal element-containing solution may be seawater or waste water from a plating factory.

In a further aspect, the present invention is directed to a method of recovering a precious metal element from a waste electronic product, the method comprising the steps of: (a) removing a coating film from a board of the waste electronic product; (b) immersing the coating film-removed board in an acidic solution, and filtering the solution; (c) adding a basic solution and deionized water to the filtered solution, and then adding the adsorbent comprising the porphyrin polymer of Formula 1 thereto, and adsorbing the precious metal element onto the adsorbent; and (d) desorbing and recovering the precious metal element from the adsorbent adsorbed with the precious metal element.

The precious metal may be selected from the group consisting of Au, Pt, Ag, Pd, Ru, Rh, Ir, Cu, and Re.

When the precious metal is gold (Au), the solution preferably has a pH of 4 or less, and when the precious metal is platinum (Pt), the solution preferably has a pH of 2-9.

The adsorption ability of the precious metal element can be increased by performing step (c) while irradiating light.

Step (d) may comprise desorbing the precious metal element by adding the adsorbent adsorbed with the precious metal element to an acidic solution.

The precious metal element recovery method may further comprise, after step (d), a step of re-inputting the adsorbent desorbed with the precious metal element into step (a).

EXAMPLES

Hereinafter, the present invention will be described in further detail with reference to examples. It will be obvious to a person having ordinary skill in the art that these examples are for illustrative purposes only and are not to be construed to limit the scope of the present invention.

Example 1: Synthesis of Porous Porphyrin Polymer

A porous porphyrin polymer was prepared by the following two-step reactions: (a) preparing 5,10,15,20-tetrakis(4-nitrophenyl)-21H,23H-porphyrin, which is the monomer of the polymer; and (b) synthesizing the porous polymer from the 5,10,15,20-tetrakis(4-nitrophenyl)-21H,23H-porphyrin.

Preparation of 5,10,15,20-tetrakis(4-nitrophenyl)-21H,23H-porphyrin (Hereinafter, Referred to as TNPPH2)

The monomer TNPPH2 was prepared by slight modification of the synthesis method reported in the literature (Bettelheim, A., et al., *Inorganic Chemistry* 26.7 (1987): 1009-1017; Yuasa, Makoto, et al., *Journal of the American Chemical Society* 126.36 (2004): 11128-11129).

11.0 g of 4-nitrobenzaldehyde was dissolved in 300 mL of propionic acid, and 12.0 mL of acetic anhydride was added to the solution. The solution was heated to a refluxing temperature, and 5.0 mL of pyrrole was added slowly to the solution. The produced mixture was further reacted at the refluxing temperature for 30 minutes, and then cooled to room temperature. The solid product was separated by filtration, dried at room temperature, and then dried in a vacuum oven at 120° C. The dried solid product was added to 120 mL of a pyridine solution, and the mixture was heated to the refluxing temperature with stirring. After 1 hour, the mixture was cooled to room temperature, and then the precipitate was filtered and rinsed with acetone. The rinsed solution was washed until no dark color appeared. The resulting purple product was dried at room temperature, and then dried in a vacuum oven at 120° C.

Preparation of Porous Porphyrin Polymer 1 g of TNPPH2, 275 mg of p-phenylenediamine and 710 mg of potassium hydroxide were added to 200 mL of water-free N,N-dimethylformamide. The mixture solution was stirred under a nitrogen atmosphere for 1 hour. The mixture solution was heated to 150° C. and allowed to react under a nitrogen atmosphere for 24 hours. After the reaction, the mixture was cooled to room temperature, and then 1 L of water was added thereto. The mixture was stirred for 1 hour, and then the precipitate was filtered and dried. The resulting black precipitate was purified by Soxhlet extraction with each of N,N-dimethylformamide and water for 1 day. The resulting product was dried in a vacuum oven at 150° C. The black powdery product was obtained in a yield of about 75.85%.

Example 2: Structural Analysis

Structural analysis was performed by measuring the FT-IR spectrum of the porous porphyrin polymer and comparing the measured FT-IR spectrum with the spectrum of FT-IR, and the results of the analysis are shown in FIG. 1. As a result, stretch at 3320 cm$^{-1}$ stretch and bending peaks at 967 cm$^{-1}$ could be seen from the amine (N—H) of the pyrrole moiety of the porphyrin structure of the corresponding polymer. In addition, it appears that the peaks at 3100, 1594, 1348 and 798 cm$^{-1}$, which correspond to sp$^2$C—H, C=C, C=N stretches and C—H bending, respectively, were caused by the heterocyclic structure of porphyrin, and peaks caused by a phenazine linking functional group produced during synthesis of the polymer appeared at similar positions. The peaks caused by the nitro group (N=O) in the monomer appeared at positions of 1518 cm$^{-1}$ and 1348 cm$^{-1}$ (overlapping with the peak of the C=N group), and these peaks existed even after synthesis of the polymer, indicating that some nitro groups of the monomer remained after synthesis of the polymer.

TABLE 1

| | Element | | | |
|---|---|---|---|---|
| | C | N | H | O |
| Expected (%) | 77.59 | 19.39 | 3.023 | 0 |
| Found (%) | 73.80 | 14.72 | 3.902 | 4.703 |

Elemental analysis indicated that a polymer having carbon, nitrogen and hydrogen contents similar to theoretically calculated values was obtained. The oxygen content is expected to be 0% in theoretical calculation under the assumption that all the nitro groups of the porphyrin structure will react with the amine group of p-phenylenediamine. However, it is believed that the oxygen produced in the actual reaction was detected due to unreacted nitro groups remaining at the chain end of the polymer and the production of phenazine oxide during the reaction.

Figure 2:
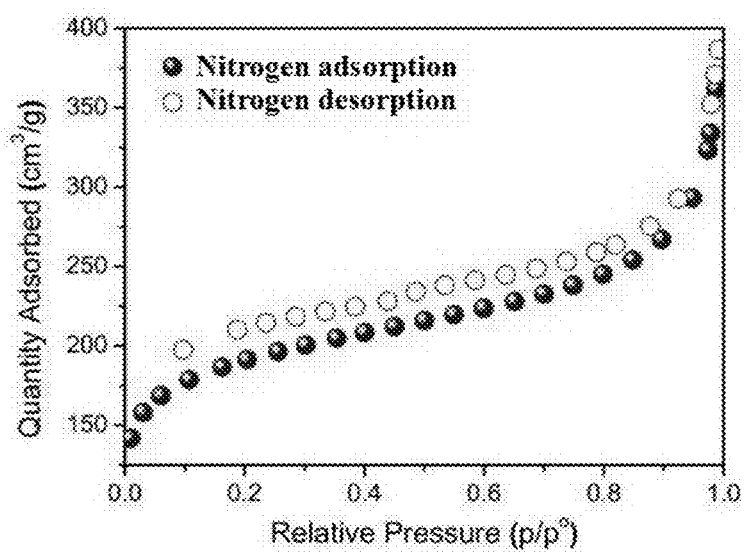
FIG. 2 is a graph showing nitrogen adsorption/desorption curves at 77 K of a synthesized porphyrin polymer.
Figure 3:
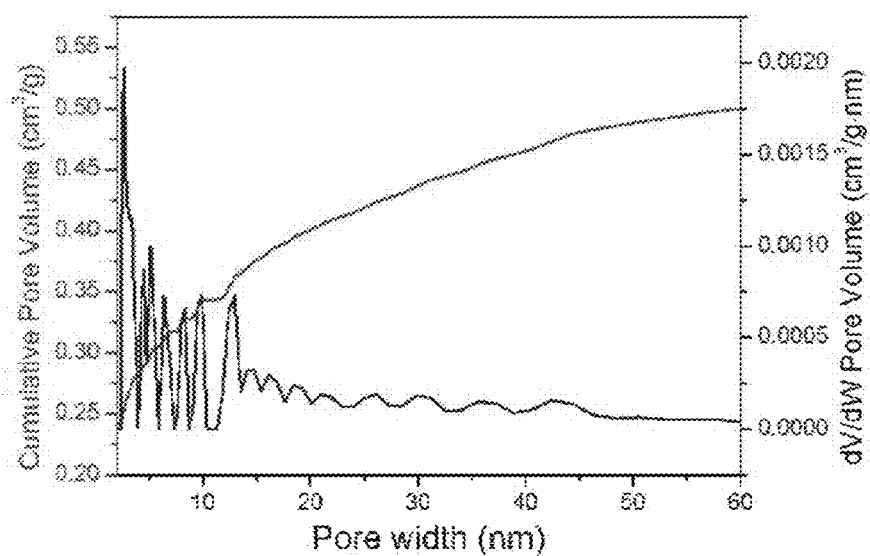
FIG. 3 is a graph showing the pore characteristics of a porous porphyrin polymer.

In addition, nitrogen adsorption/desorption isotherms of the porous porphyrin polymer were measured at 77 K, and the results are shown in FIG. 2. FIG. 3 shows the results of analyzing the pore characteristics of the porous porphyrin polymer. As a result, it was shown that the polymer had a large specific surface area of about 704 m$^2$ g$^{-1}$ and a pore size of ~15 nm, indicating that the polymer is mesoporous in nature.

Figure 4:
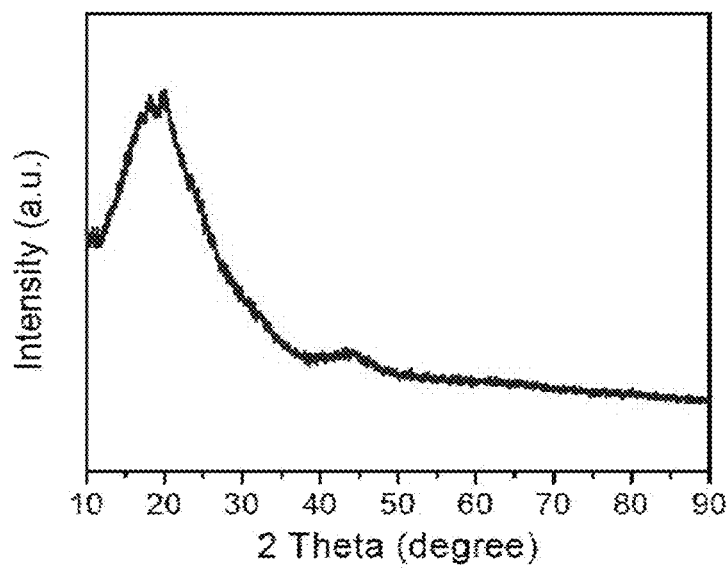
FIG. 4 is a graph showing the XRD pattern of a porous porphyrin polymer.

FIG. 4 shows the results of analyzing the X-ray diffraction of the porphyrin polymer. As can be seen therein, a broad and strong peak around 20° and a broad peak around 20° appeared, indicating that the polymer is amorphous.

Example 3: Analysis of Thermal Durability

Figure 5:
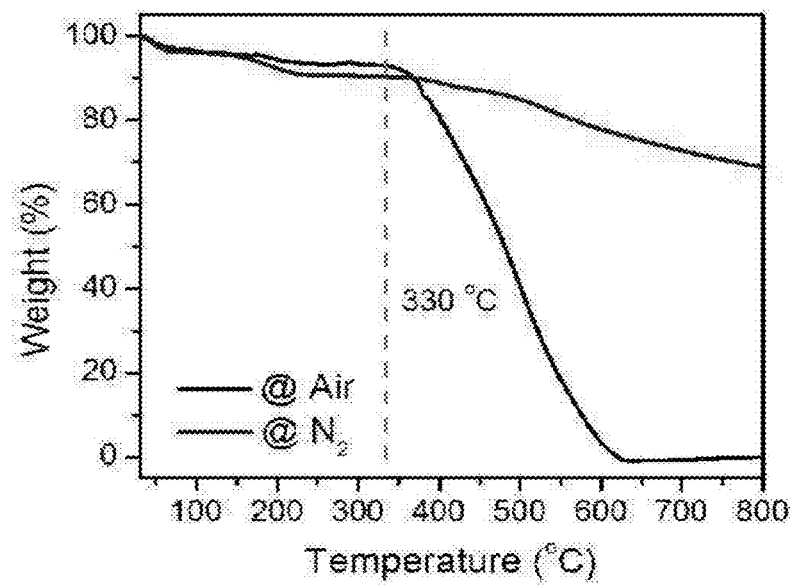
FIG. 5 is a graph showing the change in weight of a porous polymer with an increase in temperature under each of air and nitrogen atmospheres, and illustrates the thermal durability of the polymer.

The thermal durability of the porous porphyrin polymer was measured by thermogravimetry under air and nitrogen atmospheres, and the results are shown in FIG. 5. In the measurement results, a first decrease in weight of about 3 to 4% at about 100° C. or lower was attributable to the loss of water absorbed into the polymer. In addition, the weight started to decrease at around 150° C., and a second decrease to 93% in air and 90% in nitrogen appeared, and this decrease was attributable to N,N-dimethylformamide used as the solvent in each of polymer synthesis and Soxhlet extraction. It was confirmed that the polymer was stable up to 330° C. under the air and nitrogen atmospheres.

Example 4: Analysis of Metal Selectivity

In order to examine the metal ion selectivity of the synthesized porous porphyrin polymer in a solution containing various metal ions, the following experiment was performed. Specifically, as the solution containing various metal ions, an ICP standard solution (Agilent) was used. The solution contained a total of four kinds of metal ions at a concentration of 10 ppm for each kind, and was used to create a calibration curve for ICP analysis. This solution was diluted 100-fold with DI water to prepare a 100 ppb solution, and the diluted solution was divided into a total of three experimental samples and three control samples (10 mL for each group). About 10 mg of the porous porphyrin polymer was added to each experimental sample, and no adsorbent was added to each control sample. In this state, each sample was allowed to react with stirring at a speed of 8 rpm for 24 hours. After 24 hours, each of the experimental samples and the control samples was filtered using a 3 mL plastic syringe and a syringe filter (membrane-polytetrafluoroethylene, hydrophobic, 0.5 μm, housing-polypropylene). The kinds and concentrations of metal ions in each of the filtered samples were measured by an ICP-MS analyzer, and the concentrations of metal ions in each of the experimental samples and the control samples were averaged, and the results are shown in FIGS. 6 to 10. The efficiency of metal ion adsorption by the porous porphyrin polymer was obtained from the following equation by comparing the average values of the experimental groups and the control samples, and metal ion selectivity was determined by comparing the absorption rate between the kinds of metal ions. In the following equation, $C_c$ denotes the average concentration of the control samples, and $C_e$ denotes the average concentration of the experimental samples.

$$\text{Adsorption efficiency (\%)} = \frac{C_c - C_e}{C_c} \times 100(\%)$$

Figure 6:
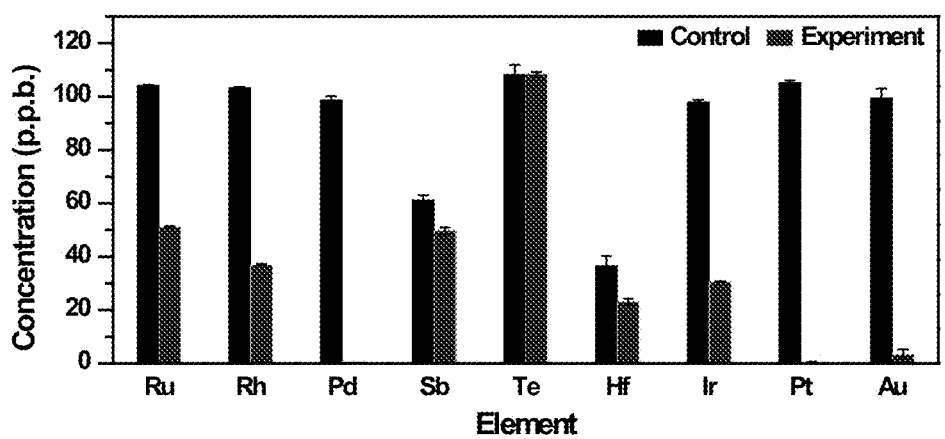
FIG. 6 is a graph showing the results of performing metal ion adsorption experiments with a porous porphyrin polymer in standard solution (1), and illustrate the metal ion selectivity of the porous porphyrin polymer.

As can be seen in FIG. 6, the porous porphyrin polymer adsorbed Ru (50.9%), Rh (64.1%), Pd (99.2%), Sb (18.7%), Te (−0.169%), Hf (37.2%), Ir (68.8%), Pt (99.5%), and Au (96.5%) in standard solution (1). The negative (−) adsorption efficiency is due to the standard deviation of the measured values.

Figure 7:
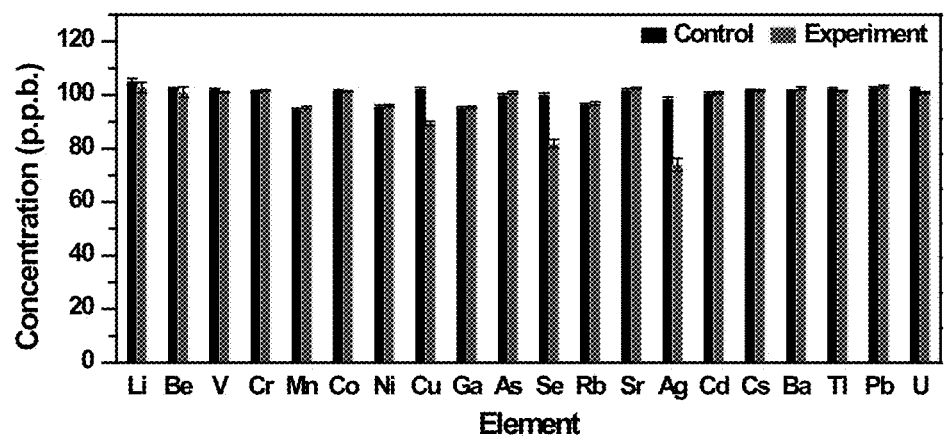
FIG. 7 is a graph showing the results of performing metal ion adsorption experiments with a porous porphyrin polymer in standard solution (2), and illustrate the metal ion selectivity of the porous porphyrin polymer.

As can be seen in FIG. 7, the porous porphyrin polymer adsorbed Li (2.17%), Be (1.18%), V (0.865%), Cr (−0.464%), Mn (−1.00%), Co (0.128%), Ni (−0.558%), Cu (12.4%), Ga (−0.460%), As (−1.24%), Se (18.1%), Rb (−0.702%), Sr (−0.723%), Ag (24.8%), Cd (−0.440%), Cs (0.0854%), Ba (−1.16%), Tl (0.635%), Pb (−0.863%), and U (1.33%) in standard solution (2). The negative (−) adsorption efficiency is due to the standard deviation of the measured values.

Figure 8:
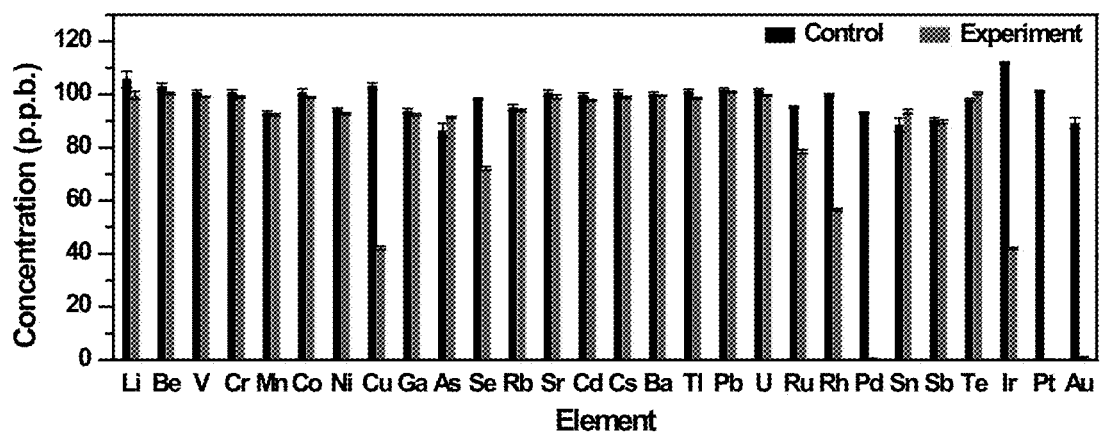
FIG. 8 is a graph showing the results of performing metal ion adsorption experiments with a porous porphyrin polymer in a mixture solution of standard solution (1) and standard solution (2), and illustrates the metal ion selectivity of the porous porphyrin polymer.

As can be seen in FIG. 8, the porous porphyrin polymer adsorbed Li (5.66%), Be (2.56%), V (1.71%), Cr (1.65%), Mn (0.852%), Co (1.84%), Ni (1.61%), Cu (59.0%), Ga (1.38%), As (−5.69%), Se (26.6%), Rb (1.08%), Sr (1.46%), Cd (1.88%), Cs (1.78%), Ba (0.608%), Tl (2.67%), Pb (0.826%), U (1.75%), 에서는 Ru (17.7%), Rh (43.4%), Pd (99.4%), Sn (−5.67%), Sb (0.709%), Te (−2.62%), Ir (62.5%), Pt (99.7%), and Au (98.8%) a mixture solution of standard solution (1) and standard solution (2). The negative (−) adsorption efficiency is due to the standard deviation of the measured values.

Figure 9:
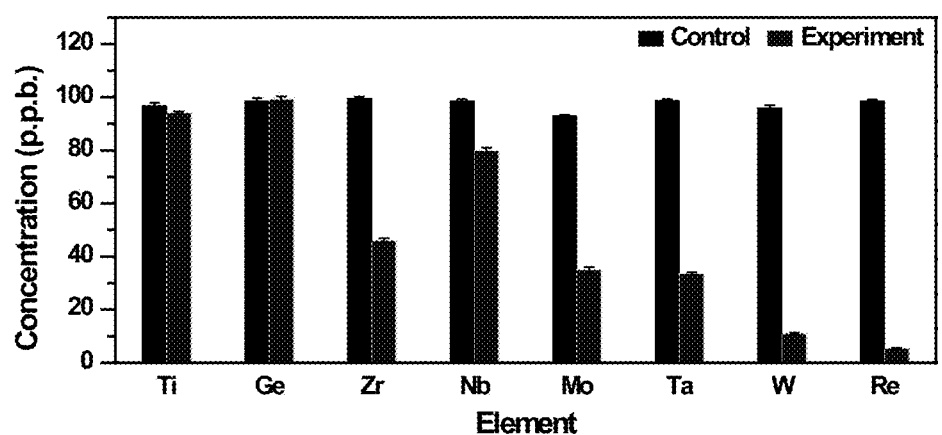
FIG. 9 is a graph showing the results of performing metal ion adsorption experiments with a porous porphyrin polymer in standard solution (3), and illustrates the metal ion selectivity of the porous porphyrin polymer.

As can be seen in FIG. 9, the porous porphyrin polymer adsorbed Ti (2.71%), Ge (−0.597%), Zr (53.8%), Nb (18.9%), Mo (62.4%), Ta (66.0%), W (88.7%), and Re (94.5%) in standard solution (3). The negative (−) adsorption efficiency is due to the standard deviation of the measured values.

Figure 10:
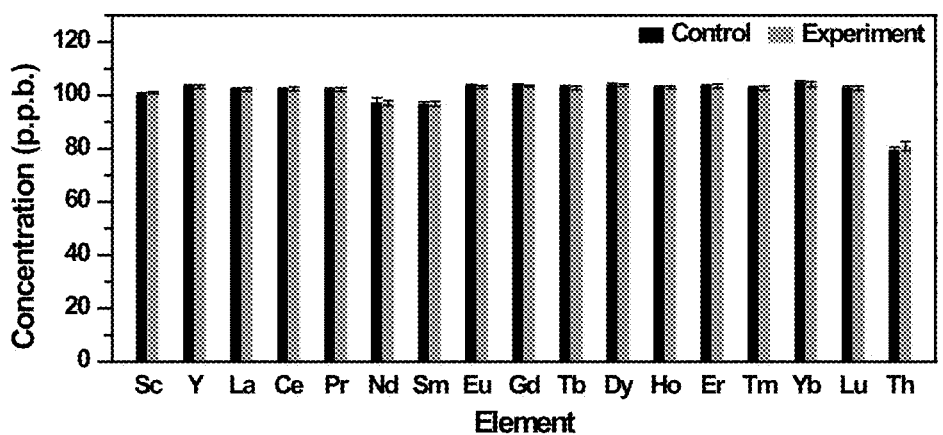
FIG. 10 is a graph showing the results of performing metal ion adsorption experiments with a porous porphyrin polymer in standard solution (4), and illustrates the metal ion selectivity of the porous porphyrin polymer.

As can be seen in FIG. 10, the porous porphyrin polymer adsorbed Sc (−0.605%), Y (0.387%), La (0.166%), Ce (−0.0879%), Pr (0.139%), Nd (0.136%), Sm (0.0761%), Eu (0.477%), Gd (0.245%), Tb (0.357%), Dy (0.211%), Ho (0.138%), Er (0.128%), Tm (0.121%), Yb (0.624%), Lu (0.189%), and Th (−1.86%) in standard solution (4). The negative (−) adsorption efficiency is due to the standard deviation of the measured values.

Figure 11:
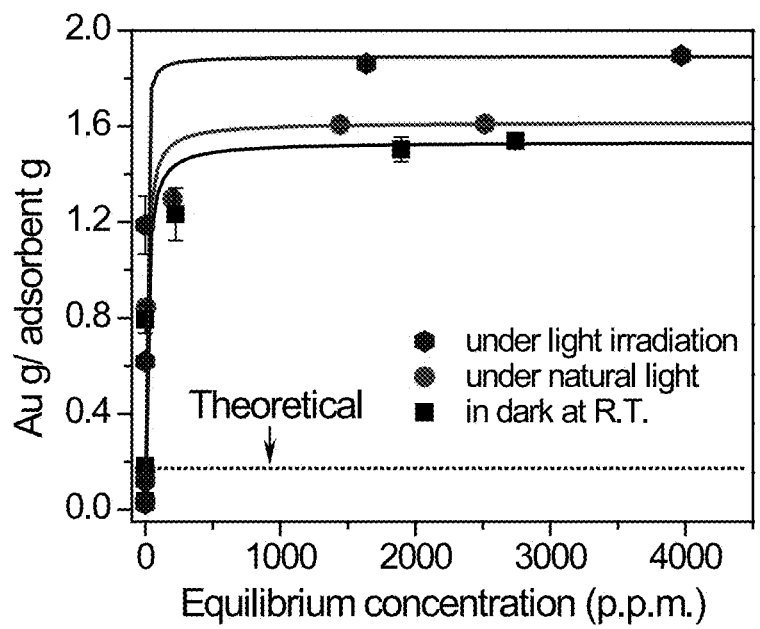
FIG. 11 is a graph showing the concentration-dependent change in adsorption of gold ions, and shows the results of performing experiments under natural light and under light-shielded conditions and under light irradiation.
Figure 12:
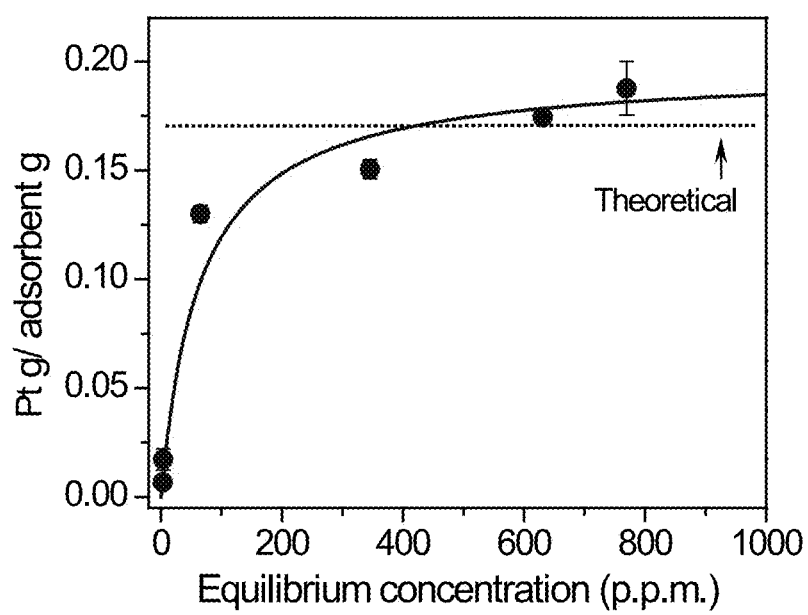
FIG. 12 is a graph showing the concentration-dependent change in adsorption of platinum ions, and shows the results of performing an experiment of natural light.

Example 5: Measurement of Adsorption Rate and Adsorption Ability for Gold and Platinum Ions In order to examine the amounts of gold and platinum metal ions adsorbed per g of the porous porphyrin polymer, the following experiment was performed. Aqueous solutions of gold ions were prepared as 20, 100, 500, 1000, 3000 and 5000 ppm solutions by dissolving gold trichloride ($HAuCl_4 \cdot H_2O$) in deionized water, and aqueous solutions of platinum ions were prepared as 10, 20, 200, 500, 800 and 1000 ppm solutions by dissolving potassium platinum chloride ($KPtCl_4$) in deionized water. The prepared solutions having the respective ion concentrations were divided into experimental samples and control samples. To each experimental sample, about 10 mg of the porphyrin polymer was added. Each of the experimental samples and the control samples was allowed to react with stirring at a speed of 8 rpm for 60 hours. After 60 hours, each of the experimental samples and the control samples was filtered through filter paper (pore size: 11 um), and the obtained solutions were analyzed by ICP-MS, thereby determining the concentrations of gold ions and platinum ions in the solutions. The amount of metal ions adsorbed by the added polymer was calculated by comparing the concentration in the experimental sample with that in the control sample, and the weight of gold or platinum ions adsorbed per mg of the porphyrin polymer was calculated by dividing by the weight of the added polymer. FIGS. 11 and 12 show the results of the experiments performed on the aqueous solutions of gold ions and the aqueous solutions of platinum ions, respectively. The experimental results indicated that 1.617 mg of gold ions could be adsorbed per mg of the porphyrin polymer, and 0.1968 mg of platinum ions could be adsorbed per mg of the porphyrin polymer.

The number of porphyrin units contained in the porous porphyrin polymer can be calculated from the nitrogen percentage obtained in the elemental analysis. Based on the calculated number of porphyrin units per weight of the polymer, the amounts of gold ions and platinum ions adsorbed per weight of the polymer can be calculated under the assumption that one metal ion bonds to one porphyrin unit. The theoretical amounts of gold ions and platinum ions adsorbed per weight of the polymer, calculated as described above, were 0.1725 mg Au/mg porphyrin polymer for gold ions, and 0.1708 mg Pt/mg porphyrin polymer for platinum ions. In the case of platinum ions, the theoretical adsorbed amount was similar to the experimental adsorbed amount. However, in the case of gold ions, the experimental adsorbed amount was much larger than the theoretical adsorbed amount, suggesting that other mechanism acts together with the mechanism by which gold ions form coordination bonds with the porphyrin units of the porphyrin polymer. As the other mechanism, the photoreduction reaction of gold ions by the effect of light was suggested, and to confirm this suggestion, the following experiment was performed under light-free conditions. Aqueous solutions of gold ions were prepared by dissolving gold trichloride at concentrations of 20, 100, 500, 1000, 3000 and 5000 ppm, and the aqueous solutions were reacted with the porous porphyrin polymer under light-free conditions for 60 hours, and then filtered, and the concentrations of gold ions in the experimental samples and the control samples were measured by ICP-MS. As a result, as shown in FIG. 11, 1.535 mg Au was adsorbed per mg of the porphyrin polymer under light-free conditions, and the adsorbed amount of Au ions under light-free conditions was smaller than that under light conditions. Such experimental results indicate that light can increase the gold ion adsorption efficiency of the porous porphyrin polymer. Meanwhile, the gold ion adsorption measured under light-free conditions was also higher than the theoretical adsorption calculated from the coordination bonding of porphyrin units. Thus, it is believed that, on the adsorption of gold ions, a bonding mechanism by a nitrogen atom having a soft property, a reduction mechanism by nitrogen, etc. act together with a coordination bonding mechanism and a photoreduction mechanism. Meanwhile, the same experiment was performed under light irradiation conditions (halogen lamp, 42 W, 630 lm), and as a result, it could be seen that about 1.892 mg of Au was adsorbed per mg of the polymer, suggesting that the adsorption of gold ions can be increased by light irradiation.

Example 6: Effect of pH on Adsorption of Gold and Platinum Ions

Figure 13:
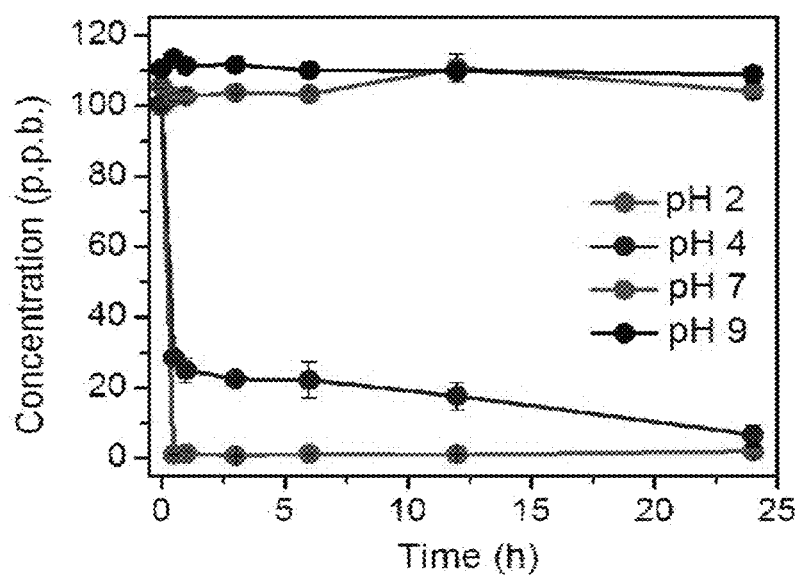
FIG. 13 shows the time-dependent adsorption of gold ions under varying pH conditions.
Figure 14:
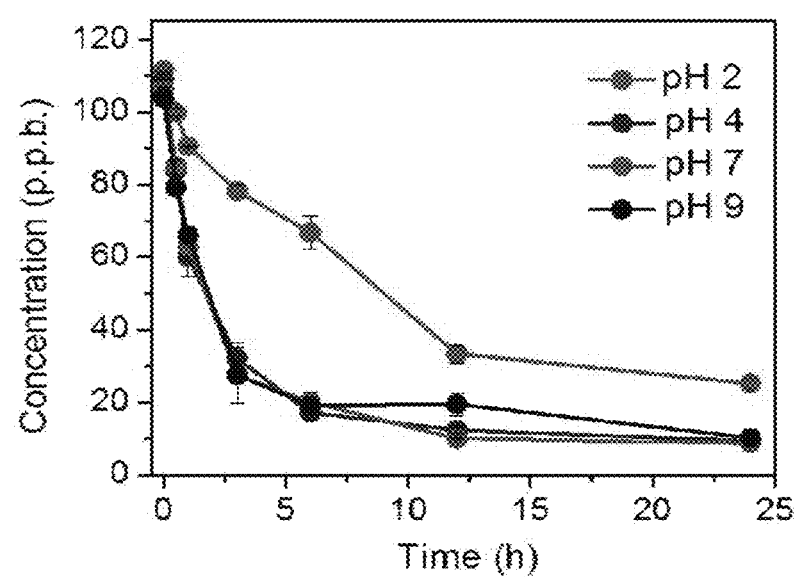
FIG. 14 shows the time-dependent adsorption of platinum ions under varying pH conditions.
Figure 15:
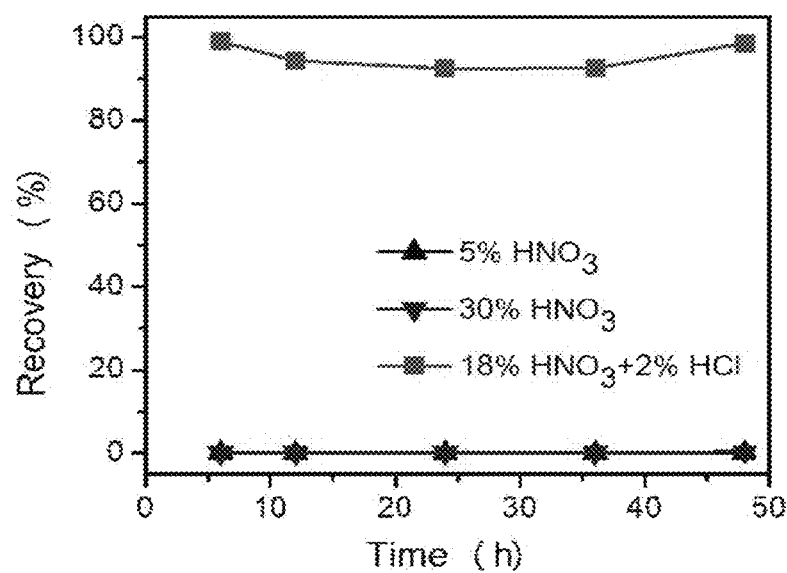
FIG. 15 is a graph showing the efficiency of time-dependent desorption of gold ions adsorbed on a porous porphyrin polymer at 80° C. under varying acidic conditions.
Figure 16:
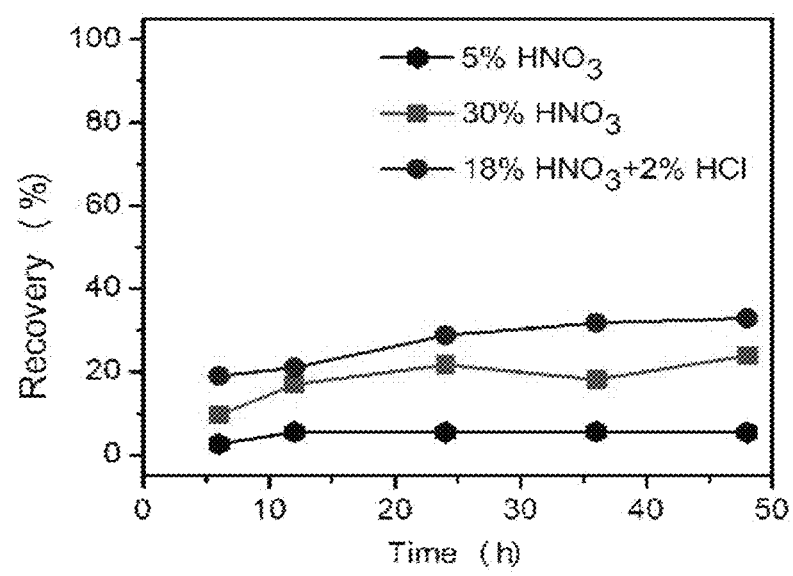
FIG. 16 is a graph showing the efficiency of time-dependent desorption of platinum ions adsorbed on a porous porphyrin polymer, at 80° C. under varying acidic conditions.
Figure 17:
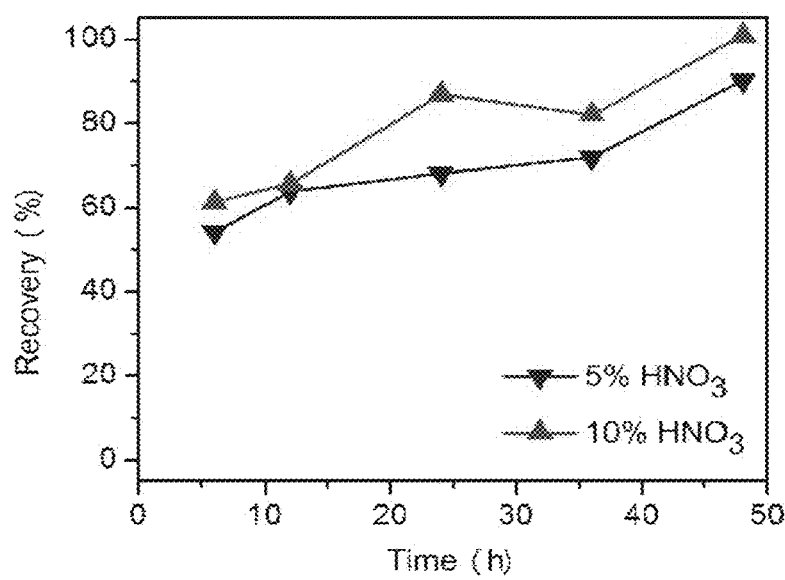
FIG. 17 is a graph showing the efficiency of time-dependent desorption of silver ions adsorbed on a porous porphyrin polymer, at 80° C. under varying acidic conditions.
Figure 18:
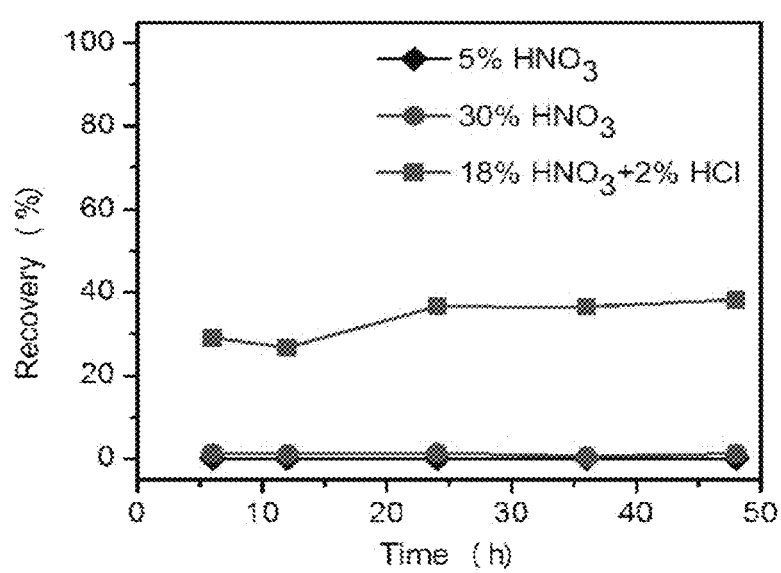
FIG. 18 is a graph showing the efficiency of time-dependent desorption of palladium ions adsorbed on a porous porphyrin polymer, at 80° C. under varying acidic conditions.

In order to examine the effect of the pH of solution on the gold and platinum ion adsorption of the porous porphyrin polymer, aqueous solutions containing about 100 ppb of each of gold and platinum ions and having pHs of 2, 4, 7 and 9 were prepared. The porphyrin polymer was added to the each of the prepared solutions, and after 30 minutes and 1, 3, 6, 12 and 24 hours, the concentrations of gold and platinum ions in each of the solutions were measured by ICP-MS, and adsorption efficiency was calculated by comparing the concentration in the experimental sample with the concentration in the control sample. FIG. 13 shows the results of the experiment on gold ions, and FIG. 14 shows the results of the experiment on platinum ions. The results of the experiments indicated that gold ions were very quickly adsorbed onto the polymer at a low pH of 4 or less and platinum ions showed slightly slow adsorption rate at pH 2, but were highly efficiently adsorbed at almost all pHs within 24 hours.

Example 7: Recovery of Adsorbed Metal

Precious metal elements adsorbed on the polymer should be capable of being desorbed and recovered from the polymer. In order to identify desorption conditions for adsorbed metal ions, gold, platinum, silver and palladium, which showed high selectivity in the metal selectivity experiment, were selected and used in the experiment. Specifically, the porous porphyrin polymer was added to each of concentrated aqueous solutions of gold, platinum, silver and palladium ions, and filtered after 48 hours such that the metal ions would be sufficiently adsorbed onto the polymer. The polymer adsorbed with the metal ions was washed with deionized water, and then dried. The resulting polymer adsorbed with each of gold, platinum, silver and palladium was added to each of 5% nitric acid solution, 30% nitric acid solution and a mixture of 18% nitric acid solution and 2% hydrochloric acid solution, and the metal ions were desorbed while each solution was stirred with a magnetic stirrer at 80° C. Under such conditions, the metal ions adsorbed on the polymer were desorbed for 6, 12, 24, 36 and 48 hours. Each solution containing desorbed metal ions and the porphyrin polymer were separated from each other by filtration. The concentration of metal ions in each solution was analyzed by ICP-MS, and the time-dependent change in desorption efficiency was examined. FIGS. 15, 16, 17 and 18 show the time-dependent changes in desorption efficiencies of gold ions, platinum, silver, and palladium, respectively. In the case of gold and platinum ions, in the mixture of 18% nitric acid solution and 2% hydrochloric acid solution, gold ions showed a desorption efficiency close to 100%, and platinum ions showed a desorption efficiency of about 30%. In the case of silver, due to formation of an insoluble salt (AgCl) in chloride ions in aqueous solution, the experiment was performed only on the nitric acid dilution, and the results of the experiment indicated that silver showed a desorption efficiency close to 100% after 48 hours in the 10% nitric acid solution. In addition, palladium showed a desorption efficiency of about 30% in the mixture of 18% nitric acid solution and 2% hydrochloric acid, similar to platinum.

Figure 19:
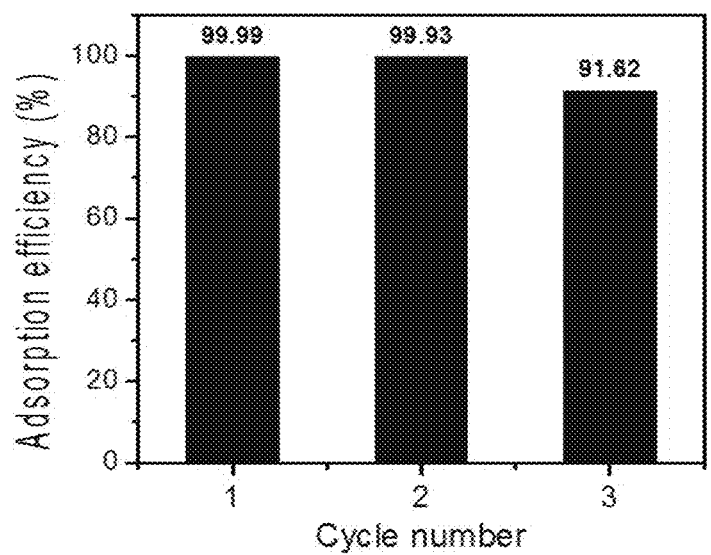
FIG. 19 shows the change in gold ion adsorption efficiency of a porous porphyrin polymer when adsorption and desorption were repeated for a total of three cycles.

Example 8: Change in Gold Ion Adsorption Efficiency by Recycling of Porous Porphyrin Polymer In order to examine the change in gold ion adsorption efficiency of the porous porphyrin polymer by repeated adsorption and desorption of metal ions, the following experiment was performed. In an adsorption experiment, the porphyrin polymer was added to an aqueous solution containing 50 ppm of gold ions and was allowed to react for 24 hours, and the amount of gold ions adsorbed was calculated by comparing the gold ion concentration of the experimental sample, to which the polymer was added, with that of the control sample to which the polymer was not added. In a desorption experiment, the polymer adsorbed with gold ions was added to 30 mL of a mixture of 18% nitric acid solution and 2% hydrochloric acid solution, and the resulting solution was stirred at 80° C. for 12 hours. To determine desorption efficiency, the polymer was separated from the acid solution after 12 hours, the concentration of gold ions in the solution was measured by ICP-MS, and the measured concentration was compared with the amount of gold ions adsorbed. As a result, as can be seen in FIG. 19, the adsorption efficiency of gold ions was 99.99% in the first cycle, 99.93% in the second cycle, and 91.62% in the third cycle, suggesting that an efficiency of 90% or higher was maintained during a total of three adsorption and desorption cycles.

Example 9: Gold Recovery from Waste Electronic Product

Figure 20:
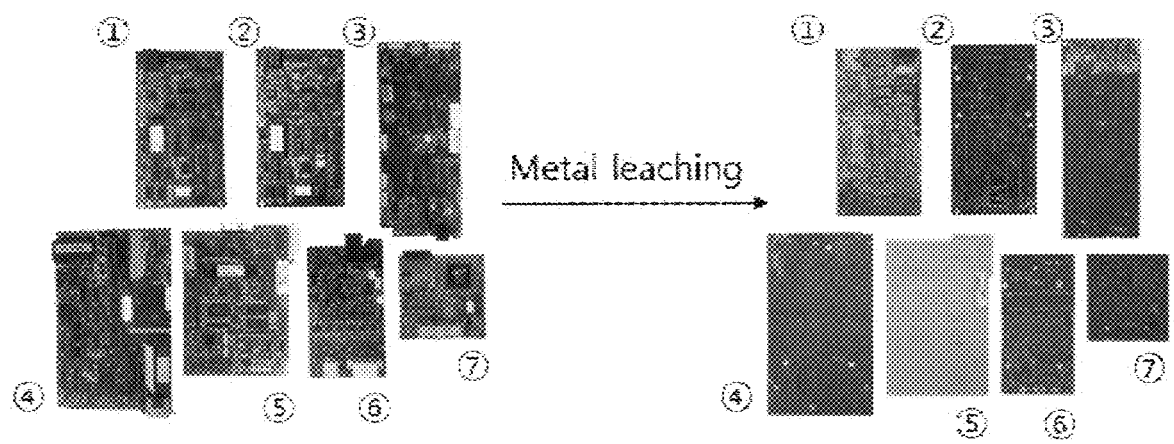
FIG. 20 is a set of photographs of waste electronic products used in an experiment on the recovery of gold contained in the waste electronic products, and shows before and after metal leaching.
Figure 21:
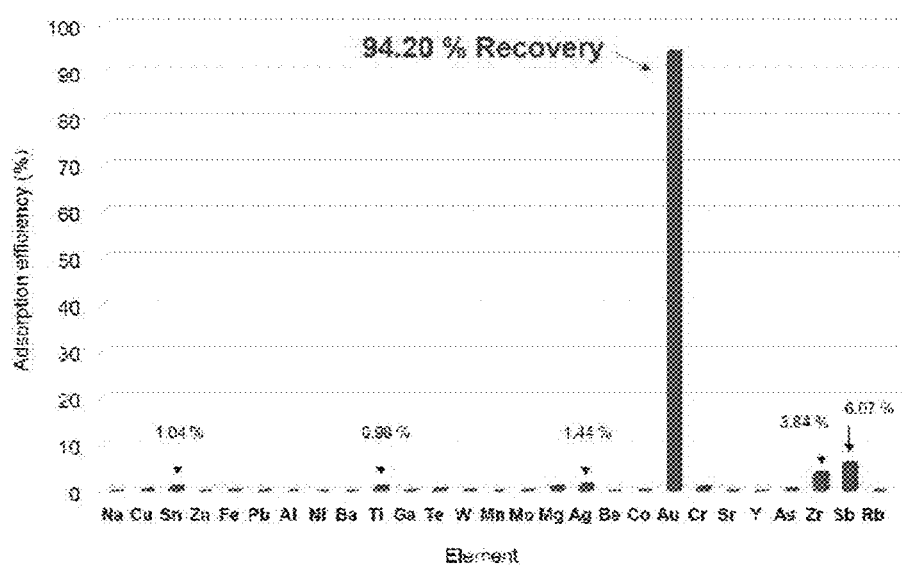
FIG. 21 shows the results of an experiment on the recovery of gold contained in waste electronic products, and shows the kinds of metal ions contained in the waste electronic products and the adsorption efficiencies of a porous porphyrin polymer.

In order to confirm the porous porphyrin polymer can be actually applied to adsorb and recover gold ions from waste electronic products, an application experiment was performed. Specifically, a total of seven electronic boards were prepared, and slight modification of the method described in the literature was applied to dissolve out metal ions from the electronic boards in solution (Jadhav, U et al., Scientific reports 5 (2015); Liu, Zhichang, et al. Nature communications 4 (2013): 1855). To remove an epoxy coating film covering the electronic boards, the electronic boards were immersed in 10 M sodium hydroxide solution for one day. The electronic boards were taken out of the sodium hydroxide solution and rinsed with tap water. The electronic boards were placed in 4 L of 1 M hydrochloric acid and nitric acid solution and left to stand at 40° C. for 2 days. After 2 days, the electronic boards were taken out of the solution, and other attributes were separated from the solution by filtration. 10 M sodium hydroxide solution and deionized water were added to the filtered solution, thereby preparing 5 L of a solution having a pH of 1 or more. 1 g of the porous porphyrin polymer was added to the solution and allowed to react with stirring for 2 days. After 2 days, the polymer was separated from the solution by filtration, and then the kinds and concentrations of gold and other metal ions in the solution before and after addition of the polymer were measured by ICP-MS, and the adsorption efficiency of each metal was calculated by comparing the measured concentrations. FIG. 20 shows actual photographs of the electronic boards used in the experiment, and Table 2 below show the kinds and contents of metal ions leached from the electronic boards. FIG. 21 is a graph showing the adsorption efficiency of metal ions adsorbed by the porphyrin polymer for each kind of metal ion leached from the electronic boards. The results of the experiment indicated that the electronic boards contained a total of 27 kinds or more of various metal ions, and particularly, the contents of copper, tin, zinc and iron ions were the highest. In the case of gold ions, about 4.5 mg was found in a total of electronic boards. The results of the experiment on the application of the porphyrin polymer to metal leachates from the electronic boards indicated that gold ions showed an adsorption efficiency of 94.20%, and other metal ions showed adsorption efficiencies of 6.07% for tin, 3.84% for zirconium, and 1% or less for other metals. Although gold ions were contained in the electronic boards in amounts very smaller than other metals, the gold ions were adsorbed onto the porphyrin polymer with a significantly higher selectivity than other metals. These experimental results show that the porous porphyrin polymer can be actually applied to metal leachates from electronic boards.

TABLE 2

| No. | Metal | Metal content (Total, mg) |
|---|---|---|
| 1 | Na | 59365.1 |
| 2 | Cu | 52366.7 |
| 3 | Sn | 20613.7 |
| 4 | Zn | 11994.8 |
| 5 | Fe | 5836.25 |
| 6 | Pb | 1850.4 |
| 7 | Al | 1258.86 |
| 8 | Ni | 558.9 |
| 9 | Ba | 445.2 |
| 10 | Ti | 148.7 |
| 11 | Ga | 86.53 |
| 12 | Te | 23.43 |
| 13 | W | 17 |
| 14 | Mn | 16.459 |
| 15 | Mo | 13.787 |
| 16 | Mg | 12.3984 |
| 17 | Ag | 7.398 |
| 18 | Be | 5.638 |
| 19 | Co | 5.128 |

TABLE 2-continued

| No. | Metal | Metal content (Total, mg) |
|---|---|---|
| 20 | Au | 4.521 |
| 21 | Cr | 3.898 |
| 22 | Sr | 3.443 |
| 23 | Y | 3.022 |
| 24 | As | 2.939 |
| 25 | Zr | 2.9257 |
| 26 | Sb | 2.579 |
| 27 | Rb | 1.732 |
| | Total | 154651.4 |

Example 10: Platinum Recovery from Seawater

Figure 22:
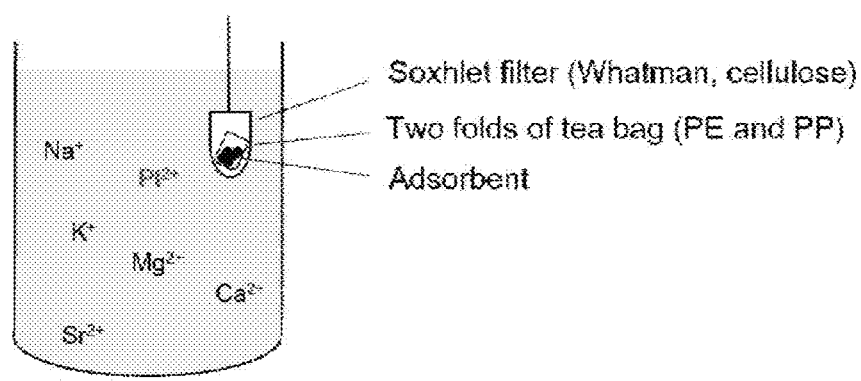
FIG. 22 is a schematic view showing an experiment performed to recover platinum from seawater.

In order to examine whether the porous porphyrin polymer can be applied for the recovery of platinum ions from seawater, the following experiment was performed. Specifically, 10.9 mg of the porphyrin polymer was placed in a 2-layer tea bag made of polyethylene and polypropylene, and the tea bag was placed in a Soxhlet filter. 1.6 mg of $K_2PtCl_4$ was dissolved in 2 kg of actual seawater (pH 7.65). The porphyrin polymer contained in the Soxhlet filter was added to the prepared platinum ion-containing seawater and stirred for 3 days. After 3 days, the polymer was separated by filtration, and then the amounts of platinum and other metals adsorbed on the polymer were measured by ICP-MS. FIG. 22 is a schematic view showing this experiment. Table 3 below shows the kinds and contents of metal ions adsorbed on the porphyrin polymer. The results of the experiment indicated that 0.736 mg of platinum from 1.6 mg of $K_2PtCl_4$ was added, the amount of platinum captured by the polymer was 40 µg. The capturing efficiency of platinum was numerically very low (0.19%), but it could be seen that platinum was adsorbed with higher efficiency than sodium, magnesium, potassium, calcium and strontium, which were contained in seawater at very higher concentrations than platinum. Thus, it could be seen that the selectivity of the porphyrin polymer for precious metal elements was maintained even in seawater. A platinum capturing efficiency of 0.19% was a very low value, but is the result obtained when the porphyrin polymer was left to stand in seawater for 3 days. In order to apply the porphyrin polymer to actual seawater to recover naturally occurring platinum ions, the porphyrin polymer should be placed in one such as a tea bag, similar to the above-described experiment, and should be left to stand for a few months or a few years. Since the selectivity of the porphyrin polymer for adsorption of precious metals is maintained even in seawater, it is expected that if the reaction time between seawater and the porphyrin polymer becomes longer as described above, the polymer can adsorb and recover platinum ions with higher efficiency.

TABLE 3

| Element | Metals in seawater (mg) | Captured metals (µg) | Capturing efficiency (%) |
|---|---|---|---|
| Na | 16448 | 19.1 | 0.000116 |
| Mg | 1780 | 1.34 | 0.000075 |
| K | 543 | 151 | 0.027808 |
| Ca | 27.7 | 0.273 | 0.000986 |
| Sr | 9.86 | 0.0616 | 0.000625 |
| Pt | 0.736 | 1.40 | 0.190217 |

Example 11: Increase in Gold Ion Adsorption Ability by Light Irradiation

Figure 23:
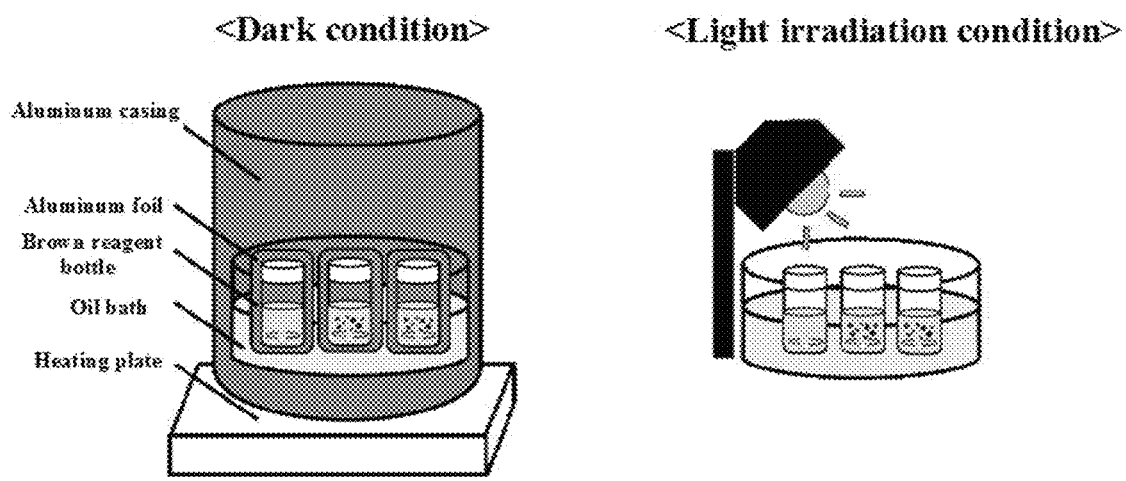
FIG. 23 is a schematic view showing an experiment performed to confirm that the adsorption of gold ions is increased by light irradiation according to one embodiment of the present invention.

In order to examine whether gold ions are adsorbed in an increased amount under light conditions compared to dark conditions as observed in Example 5, the following experiment was performed. FIG. 23 shows a schematic view of the experiment performed. As shown in FIG. 23, 60 mL of an aqueous solution containing 740 ppm of gold ions was prepared by dissolving $HAuCl_4$ in deionized water, and 10 mL of the solution was placed in each of the three brown reagent bottles and placed in each of the three transparent reagent bottles. 5 mg of the porous porphyrin polymer was added to each of two of the solution-containing brown reagent bottles, and 5 mg of the porphyrin polymer was also added to each of two of the solution-containing transparent reagent bottles. The solution contained in each of the three brown reagent bottles was subjected to an adsorption experiment under dark conditions, and the solution contained in each of the three transparent reagent bottles was subjected to an adsorption experiment under light irradiation conditions. The dark conditions were formed by covering the surface of the reagent bottles with an aluminum foil, placing the reagent bottles in an oil bath, placing the oil bath on a heating plate, and then surrounding the oil bath with an aluminum casing. The light irradiation conditions were formed by placing the three transparent reagent bottles in an oil bath, and disposing a halogen lamp above the reagent bottles. Since the temperature of the oil bath is increased by light irradiation, the heating plate was used to provide the same temperature. The temperature of the two types of conditions was 28° C. Under such conditions, all the solutions were allowed to react for 48 hours while they were stirred with a magnetic stirrer. After the reaction, all the solutions were filtered, the gold ion concentrations of the solutions, to which the polymer was added, and the solutions to which the polymer was not added, were analyzed by ICP-MS, and the amounts of gold ions adsorbed were calculated based on the measured gold ion concentrations. As a result, it could be seen that the amount of gold ions adsorbed under the dark conditions was 0.917 mg gold ions/mg polymer, but the amount of gold ions adsorbed under the light irradiation conditions was 1.375 mg gold ions/mg polymer, which was increased by about 1.5 times. This suggests that the ability of the polymer to adsorb gold ions was increased by light irradiation. This method can be used to increase the ability to adsorb precious metals contained in metal leachates from waste electronic products or in industrial wastewater.

In the present invention, the porphyrin comprising porphyrin units linked by phenazine was synthesized, and the structural characteristics (such as pore characteristics) and thermal stability of the polymer were analyzed. In addition, from the experiment on the selectivity of the polymer for adsorption of metal ions, it could be seen that the polymer had high selectivity for precious metal elements. In addition, examination was performed of the amounts of precious metal elements (gold and platinum ions), the change in adsorption efficiency with a change in the pH of solution, and the desorption efficiency of adsorbed metal ions in various diluted acid solutions. The results of the experiment indicated that 1.617 mg of gold ions and 0.1968 mg of platinum ions were adsorbed per mg of the polymer, suggesting that these elements could be highly efficiently adsorbed per weight of the polymer. It was confirmed that the amount of gold ions adsorbed could be about 1.5-fold increased under light irradiation conditions. In addition, it could be seen that the polymer highly efficiently adsorbed gold ions at a low pH of 4 or less and platinum ions at various pHs, including a pH of 2 or more, and adsorbed metal ions, such as gold and platinum ions, could be desorbed by heat treatment at 80° C. in 18% nitric acid solution and 2% hydrochloric acid solution. The adsorption efficiency of gold ions was maintained at 90% or higher even when adsorption and desorption were repeated for three cycles. In addition, when the porphyrin polymer of the present invention was actually applied to metal leachates from electronic boards and to seawater, gold ions could be adsorbed and separated from the electronic boards with an efficiency of 94% and with higher selectivity than other metals, and platinum ions were adsorbed with an adsorption efficiency of 0.19% and with higher selectivity than other metals. These results suggest that the porphyrin polymer is highly applicable for the selective adsorption and recycling of gold ions from metal leachates of waste electronic products and for the adsorption and recycling of precious metal ions (such as platinum ions) from seawater. Precious metal elements, such as gold, platinum and silver, play a key role in high-tech industries due to their excellent physical and chemical properties, and the demand therefor is increasing as science and technology are highly developed. However, such metals occur naturally in very small amounts and are being concentrated in some countries. In Korea, the electronics industry has been highly developed, but underground resources are very scarce. Meanwhile, the waste of electronic products is increasing year by year as the electronics industry develops, and the waste may cause serious environmental pollution. Accordingly, there is a need for the development of a method capable of treating waste electronic products in a safer manner. In particular, since the value of most of waste electronic products comes from the precious metal elements contained therein, technology of recycling precious metal elements from waste electronic products is attracting increasing attention. The size of waste electronic product recycling market is increasing year by year worldwide. The size of waste electronic product recycling market in Asia and the Pacific is expected to reach 4.01 billion dollars in 2017. It appears that the porous porphyrin polymer adsorbent may be used to adsorb and recycle gold ions from metal leachates of waste electronic products with higher selectivity than other metals, and this technology is expected to have economic and industrial effects on waste treatment and recycling of expensive precious metal elements.

INDUSTRIAL APPLICABILITY

The porous porphyrin polymer according to the present invention has an excellent ability to adsorb precious metal elements, such as gold and platinum, and thus may be applied to the recovery of precious metal elements either from metal leachates of waste electronic products or from natural river water or seawater.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A porphyrin polymer represented by Formula 1-1:

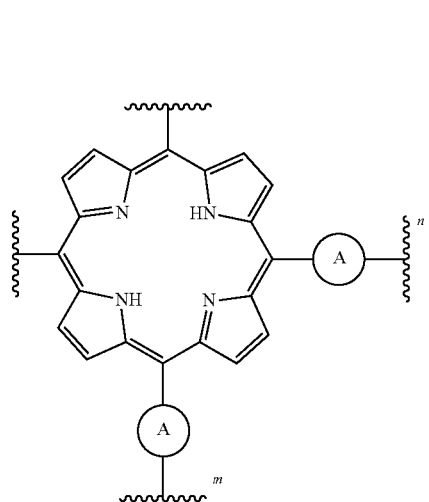

[Formula 1-1]

wherein n and m are repeated numbers of repeating units and n is an integer of 5,000 to 50,000, and m is an integer of 5,000 to 50,000 and

is Formula 3, Formula 5, Formula 6, or Formula 7,

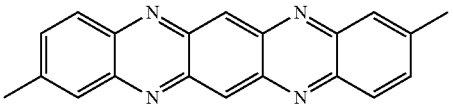

[Formula 3]

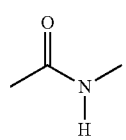

[Formula 5]

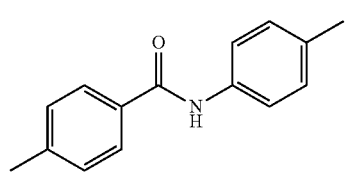

[Formula 6]

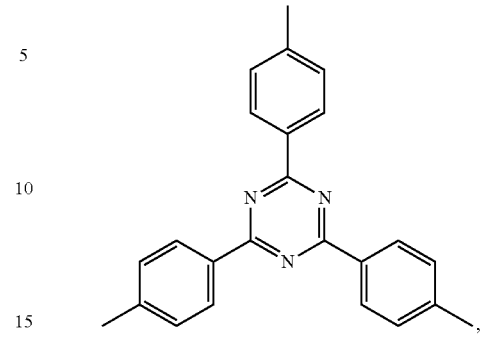

[Formula 7]

wherein the porphyrin polymer has a specific surface area of 300-1000 $m^2g^{-1}$ and a pore size of 0-20 nm.

2. The porphyrin polymer of claim 1, which is represented by Formula 2:

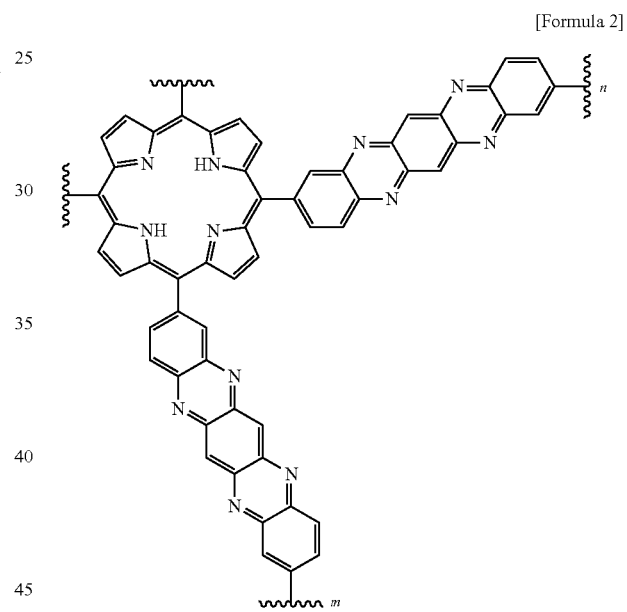

[Formula 2]

wherein n is an integer of 5,000 to 50,000, and m is an integer of 5,000 to 50,000.

3. A method of preparing the porphyrin polymer of claim 1, comprising:
polymerizing a 5,10,15,20-tetrakis(4-nitrophenyl)-21H, 23H-porphyrin monomer.

4. The method of preparing the porphyrin polymer of claim 3, wherein the 5,10,15,20-tetrakis(4-nitrophenyl)-21H,23H-porphyrin monomer is obtained by dissolving 4-nitrobenzaldehyde in propionic acid and then adding acetic anhydride and pyrrole with the solution and reacting.

5. The method of preparing the porphyrin polymer of claim 3, comprising:
obtaining a reaction product by mixing and reacting the 5,10,15,20-tetrakis(4-nitrophenyl)-21H,23H-porphyrin monomer, p-phenylenediamine and a base in water-free N,N-dimethylformamide; and
obtaining a precipitate by adding water to the reaction product, and obtaining the porphyrin polymer by filtering and drying the precipitate.

6. An adsorbent comprising the porphyrin polymer of claim 1.

7. A method of recovering a precious metal element from a precious metal element-containing solution, comprising:
   (a) adding the adsorbent of claim 6 to the precious metal element-containing solution, and adsorbing the precious metal element onto the adsorbent; and
   (b) desorbing and recovering the precious metal element from the adsorbent adsorbed with the precious metal element.

8. The method of recovering a precious metal element from a precious metal element-containing solution of claim 7, wherein the precious metal element-containing solution is seawater or waste water from a plating factory.

9. A method of recovering a precious metal element from a waste electronic product, comprising:
   (a) removing a coating film from a board of the waste electronic product;
   (b) immersing the coating film-removed board in an acidic solution, and filtering the solution;
   (c) adding a basic solution and deionized water to the filtered solution, and then adding the adsorbent of claim 6 thereto, and adsorbing the precious metal element onto the adsorbent; and
   (d) desorbing and recovering the precious metal element from the adsorbent adsorbed with the precious metal element.

10. The method of recovering a precious metal element from a precious metal element-containing solution of claim 7, wherein the precious metal is selected from the group consisting of Au, Pt, Ag, Pd, Ru, Rh, Ir, Cu, and Re.

11. The method of recovering a precious metal element from a precious metal element-containing solution of claim 7, wherein when the precious metal is gold (Au), the solution has a pH of 4 or less, and when the precious metal is platinum (Pt), the solution has a pH of 2-9.

12. The method of recovering a precious metal element from a precious metal element-containing solution of claim 7, wherein step (b) comprises desorbing the precious metal element by adding the adsorbent adsorbed with the precious metal element to an acidic solution.

13. The method of recovering a precious metal element from a waste electronic product of claim 9, wherein step (d) comprises desorbing the precious metal element by adding the adsorbent adsorbed with the precious metal element to an acidic solution.

14. The method of recovering a precious metal element from a precious metal element-containing solution of claim 7, further comprising, after step (b), a step of re-inputting the adsorbent desorbed with the precious metal element into step (a).

15. The method of recovering a precious metal element from a waste electronic product of claim 9, further comprising, after step (d), a step of re-inputting the adsorbent desorbed with the precious metal element into step (a).

16. The method of recovering a precious metal element from a precious metal element-containing solution of claim 7, wherein step (a) comprises adsorbing the precious metal element onto the adsorbent while irradiating light.

17. The method of recovering a precious metal element from a waste electronic product of claim 9, wherein step (c) comprises adsorbing the precious metal element onto the adsorbent while irradiating light.

18. The method recovering a precious metal element from a waste electronic product of claim 9, wherein the precious metal is selected from the group consisting of Au, Pt, Ag, Pd, Ru, Rh, Ir, Cu, and Re.

* * * * *